(12) United States Patent
Saito et al.

(10) Patent No.: US 9,950,636 B2
(45) Date of Patent: Apr. 24, 2018

(54) FOREIGN MATTER DETECTION DEVICE AND METHOD FOR WIRELESS POWER SUPPLY DEVICE

(71) Applicant: IHI CORPORATION, Tokyo (JP)

(72) Inventors: Hiroki Saito, Tokyo (JP); Susumu Tokura, Tokyo (JP)

(73) Assignee: IHI CORPORATION, Tokyo (JP)

( * ) Notice: Subject to any disclaimer, the term of this patent is extended or adjusted under 35 U.S.C. 154(b) by 248 days.

(21) Appl. No.: 14/867,053

(22) Filed: Sep. 28, 2015

(65) Prior Publication Data

US 2016/0016478 A1     Jan. 21, 2016

Related U.S. Application Data

(63) Continuation of application No. PCT/JP2014/068168, filed on Jul. 8, 2014.

(30) Foreign Application Priority Data

Jul. 16, 2013  (JP) .................. 2013-147603
Jul. 23, 2013  (JP) .................. 2013-152515

(51) Int. Cl.
  *H01F 37/00*  (2006.01)
  *B60L 11/18*  (2006.01)
  (Continued)

(52) U.S. Cl.
  CPC ............ *B60L 11/182* (2013.01); *H01F 27/38* (2013.01); *H01F 27/402* (2013.01); *H01F 38/14* (2013.01);
  (Continued)

(58) Field of Classification Search
  CPC .......... H02J 7/025; H02J 5/005; H04B 5/0037
  See application file for complete search history.

(56) References Cited

U.S. PATENT DOCUMENTS

2008/0180091 A1*  7/2008  Kakuya ............... G01D 5/2006
                                                  324/207.16
2013/0099592 A1   4/2013  Abe
2013/0169062 A1*  7/2013  Maikawa .............. H01F 38/14
                                                  307/104

FOREIGN PATENT DOCUMENTS

EP      2717431 A1    9/2014
JP      07-079182 A   3/1995
(Continued)

OTHER PUBLICATIONS

Chinese Office Action with English translation, Chinese Patent Application No. 201480019565.2, dated Dec. 21, 2016, 22 pgs.
(Continued)

*Primary Examiner* — Sibin Chen
(74) *Attorney, Agent, or Firm* — Volpe and Koenig, P.C.

(57) ABSTRACT

A foreign matter detection device including a detection coil between a power transmitting coil and a power receiving coil, and a detection unit detecting an induced voltage V generated in the detection coil and detects, from this induced voltage, presence or absence of a conductive foreign matter between the power transmitting coil and the power receiving coil. The detection coil includes a continuous conductive wire where two loop portions are wound in mutually opposite directions. An area or a winding number of each loop portion or a direction connecting centroids of the two loop portions is set so that the induced voltage (i.e., a reference voltage) generated in the detection coil when no conductive foreign matters exist becomes 0 or a minimum.

6 Claims, 13 Drawing Sheets

(51) Int. Cl.
*H02J 50/60* (2016.01)
*H02J 50/10* (2016.01)
*H01F 38/14* (2006.01)
*H01F 27/38* (2006.01)
*H01F 27/40* (2006.01)
*H02J 5/00* (2016.01)
*H02J 7/04* (2006.01)
*B60M 7/00* (2006.01)
*H02J 7/02* (2016.01)

(52) U.S. Cl.
CPC .............. *H02J 5/005* (2013.01); *H02J 7/042* (2013.01); *H02J 50/10* (2016.02); *H02J 50/60* (2016.02); *B60L 2270/147* (2013.01); *B60M 7/003* (2013.01); *H02J 7/025* (2013.01); *Y02T 10/7005* (2013.01); *Y02T 10/7072* (2013.01); *Y02T 90/122* (2013.01); *Y02T 90/14* (2013.01)

(56) References Cited

FOREIGN PATENT DOCUMENTS

| | | |
|---|---|---|
| JP | 10-290186 A | 10/1998 |
| JP | 2010-226889 A | 10/2010 |
| JP | 2012-016125 A | 1/2012 |
| JP | 2012-249401 A | 12/2012 |
| JP | 2013-090392 A | 5/2013 |

OTHER PUBLICATIONS

International Search Report, PCT/JP2014/068168, dated Aug. 19, 2014, 2 pgs.

Chinese Office with English Translation, Chinese Patent Application No. 201480019565.2, dated Aug. 22, 2017, 22 pgs.

* cited by examiner

[FIG. 1A]
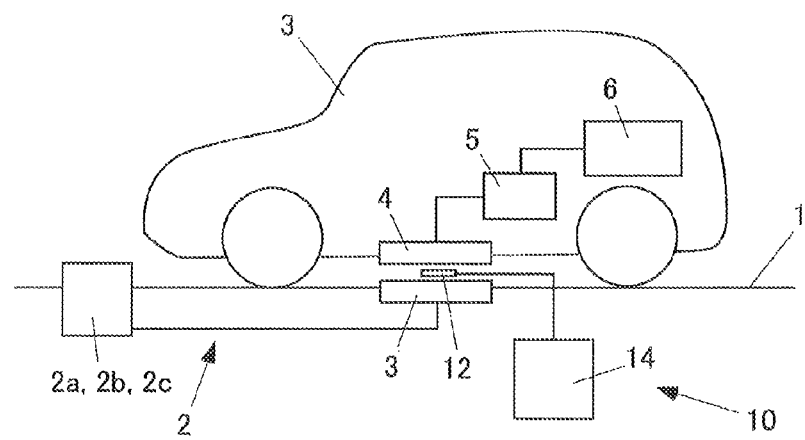
[FIG. 1B]
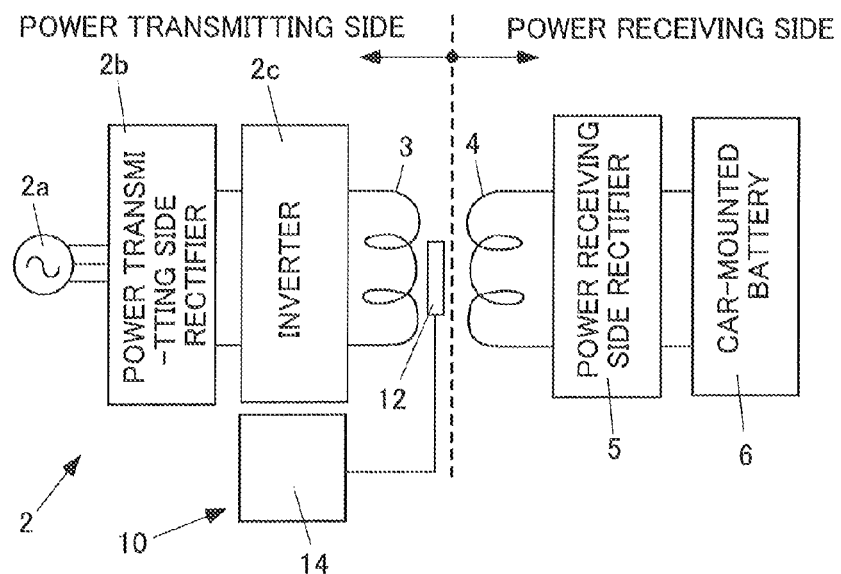

[FIG. 2A]
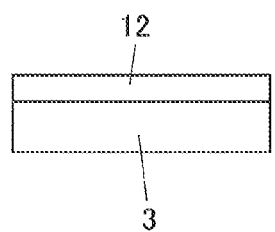
[FIG. 2B]
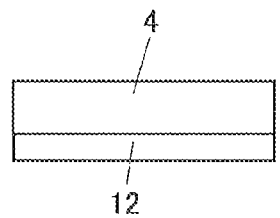
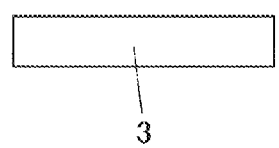
[FIG. 2C]
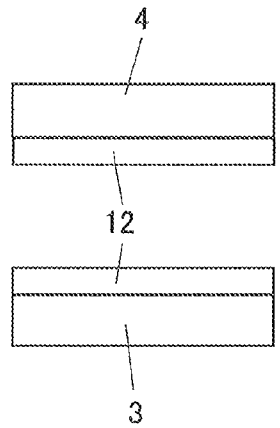

[FIG. 3]
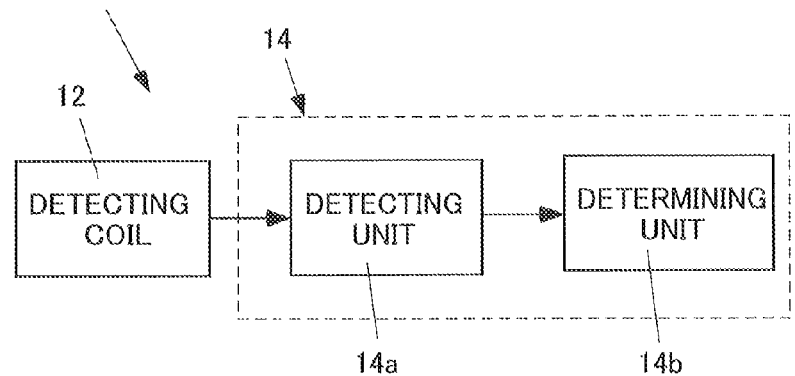

[FIG. 4A]
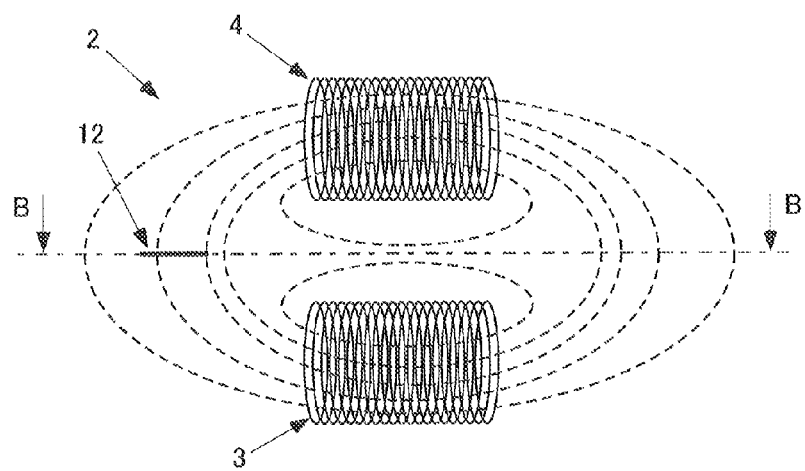
[FIG. 4B]
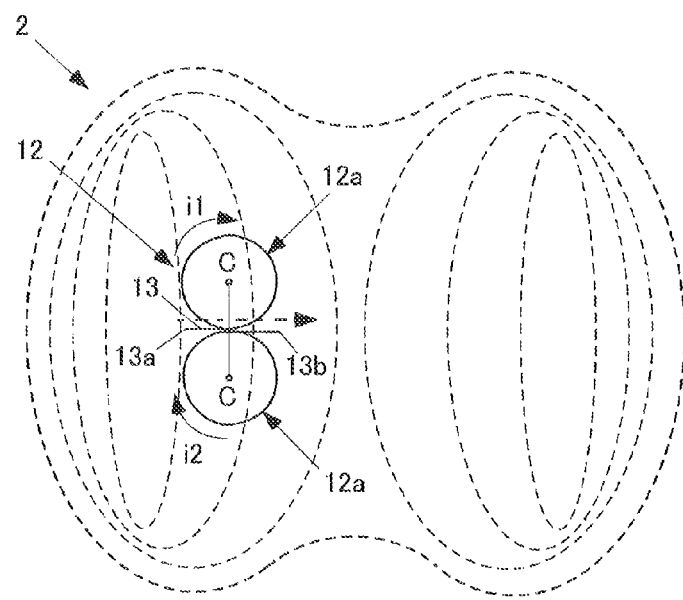

[FIG. 5A]
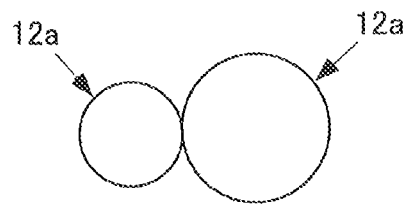
[FIG. 5B]
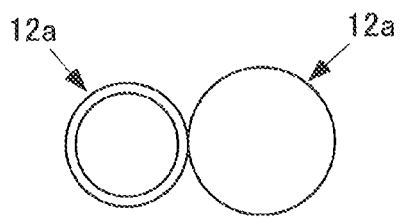
[FIG. 5C]
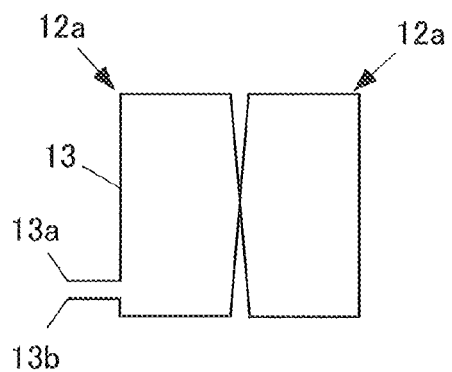

[FIG. 6A]
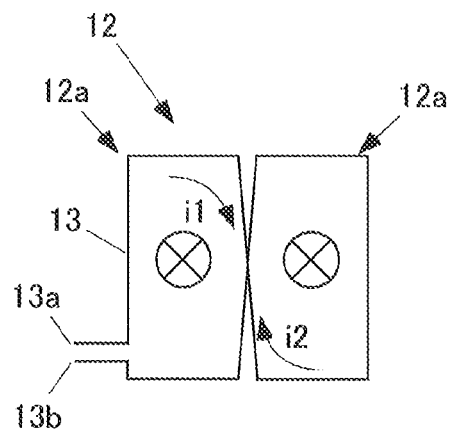
[FIG. 6B]
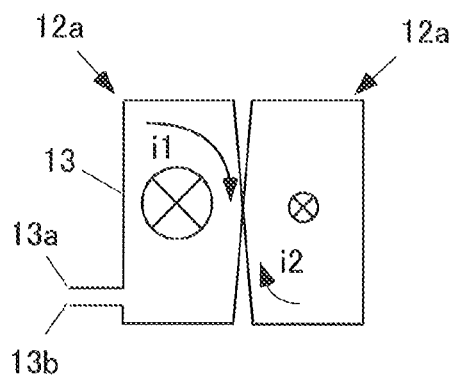

[FIG. 7]
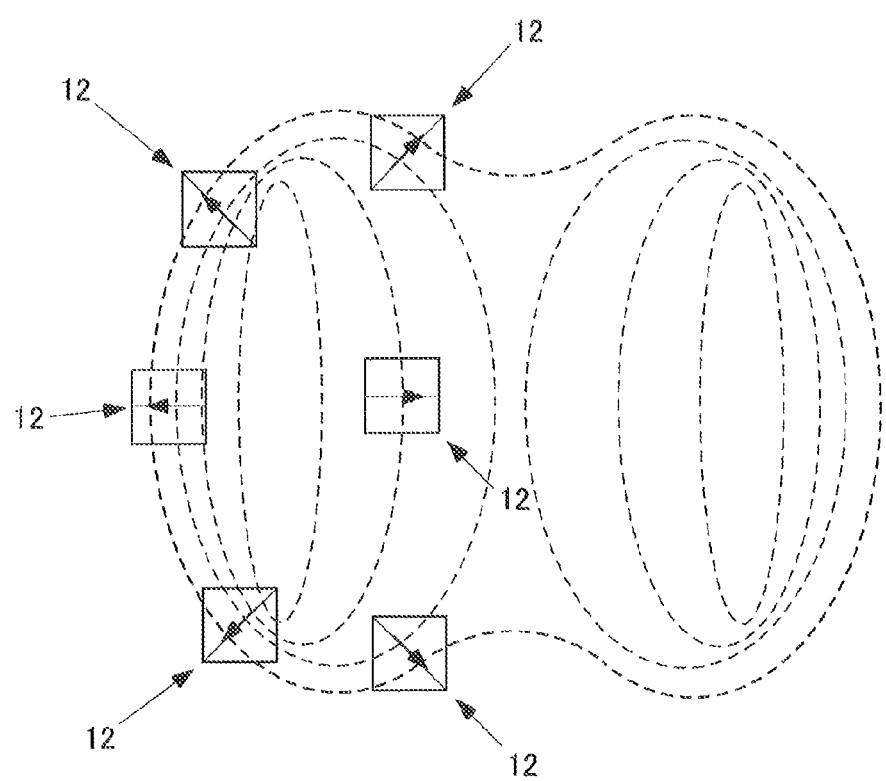

[FIG. 8]
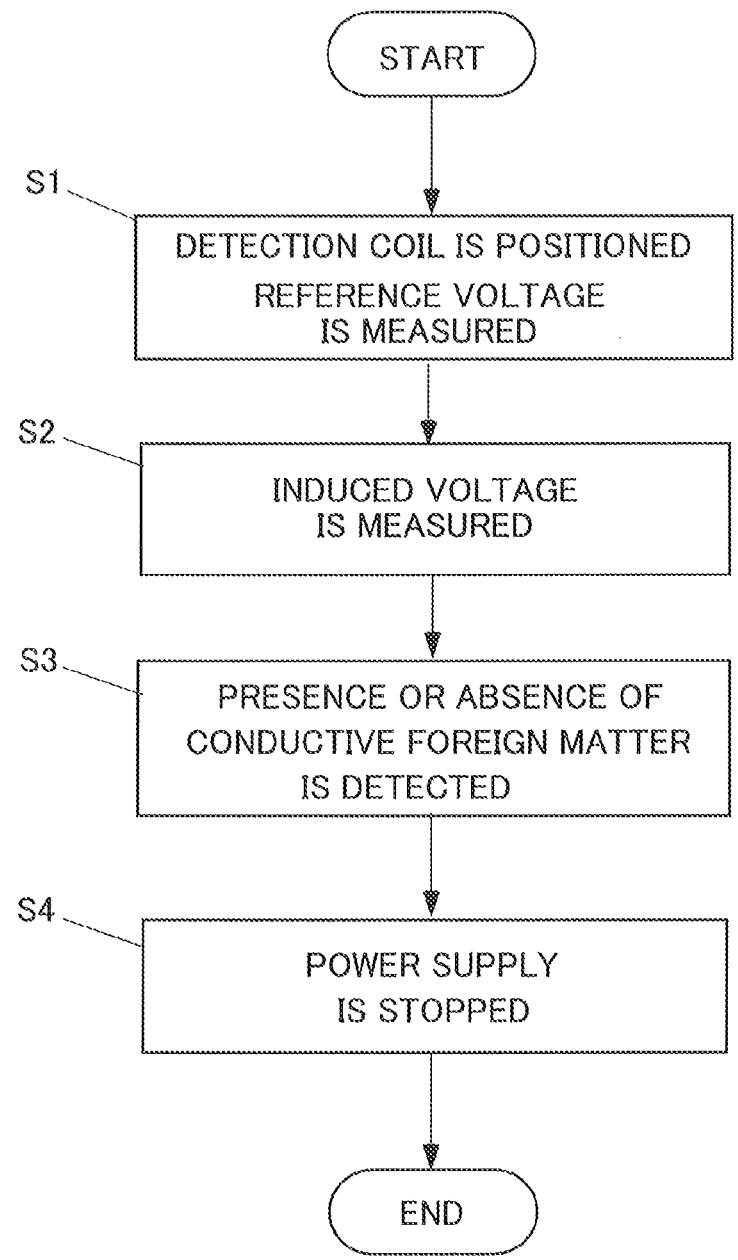

[FIG. 9]
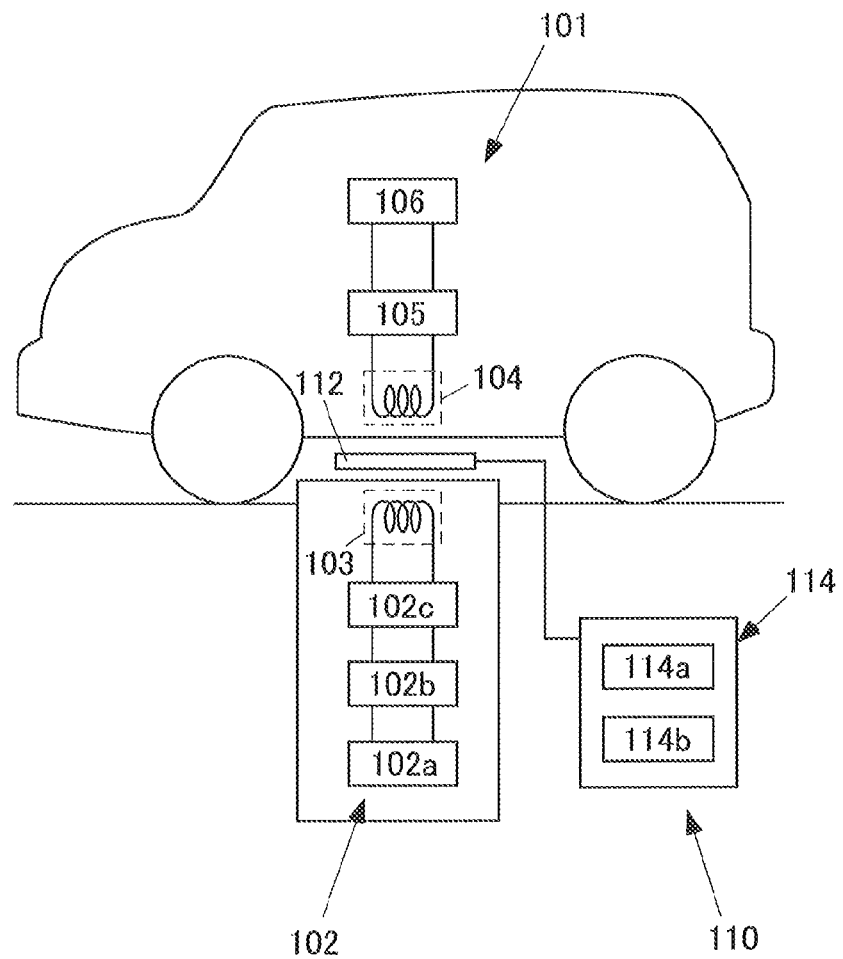

[FIG. 10A]
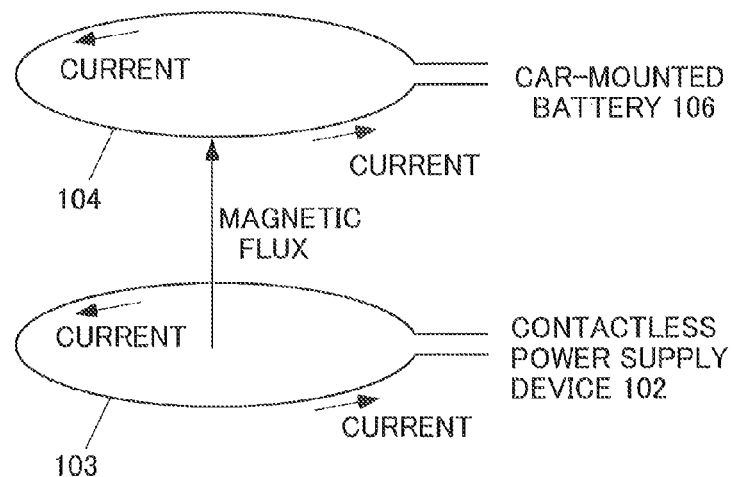
[FIG. 10B]
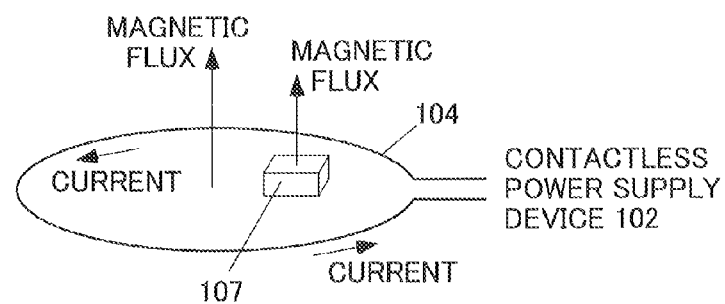
[FIG. 10C]
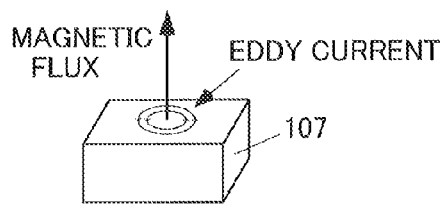

[FIG. 11]
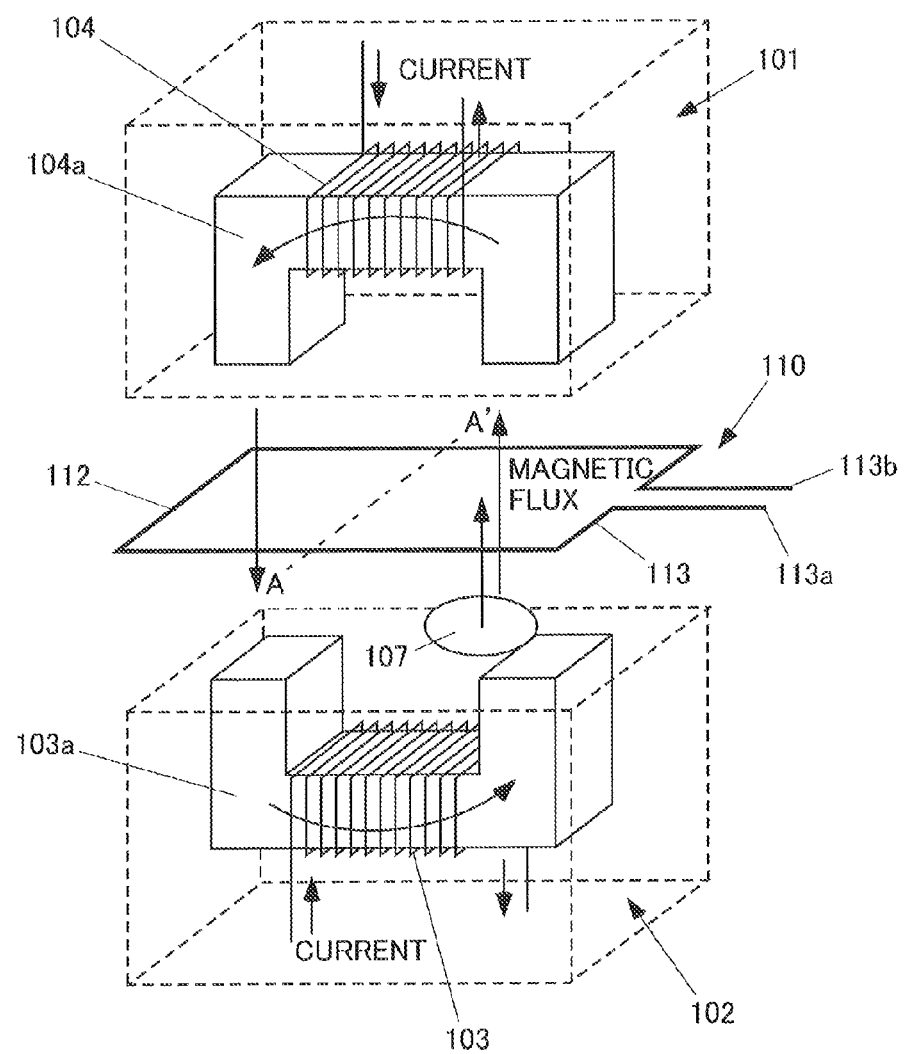

[FIG. 12]
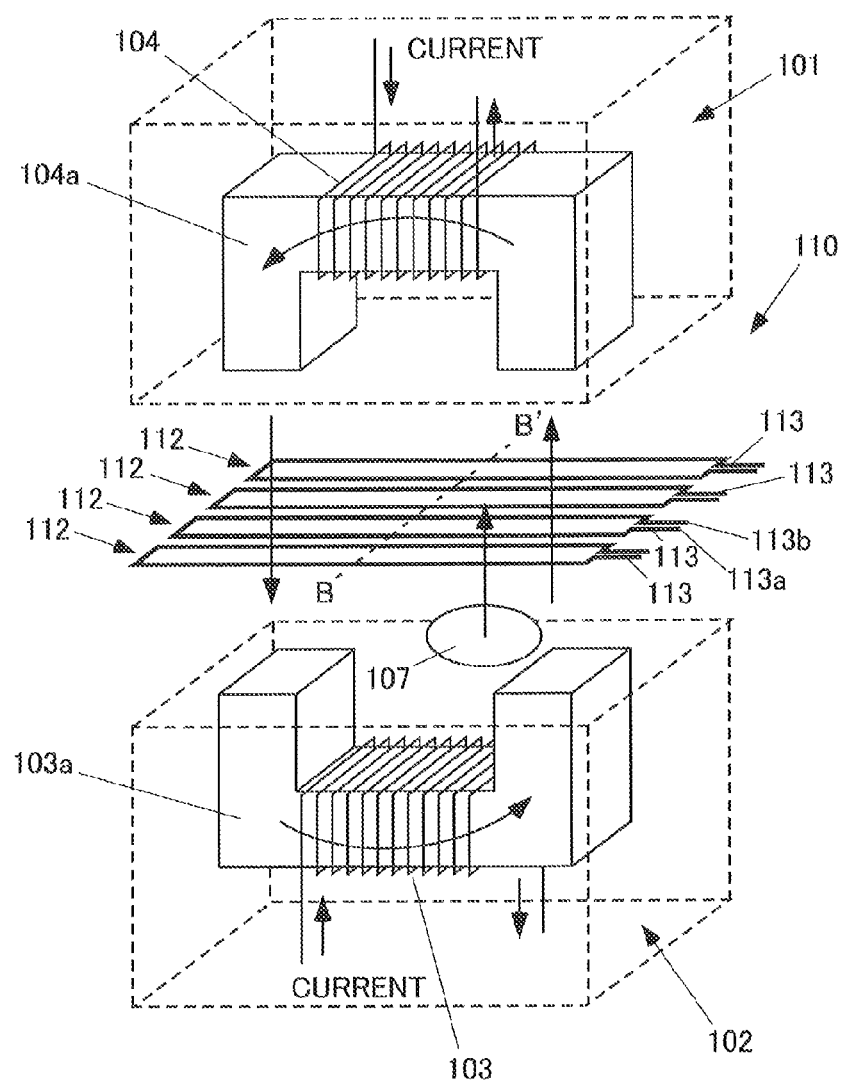

[FIG. 13]
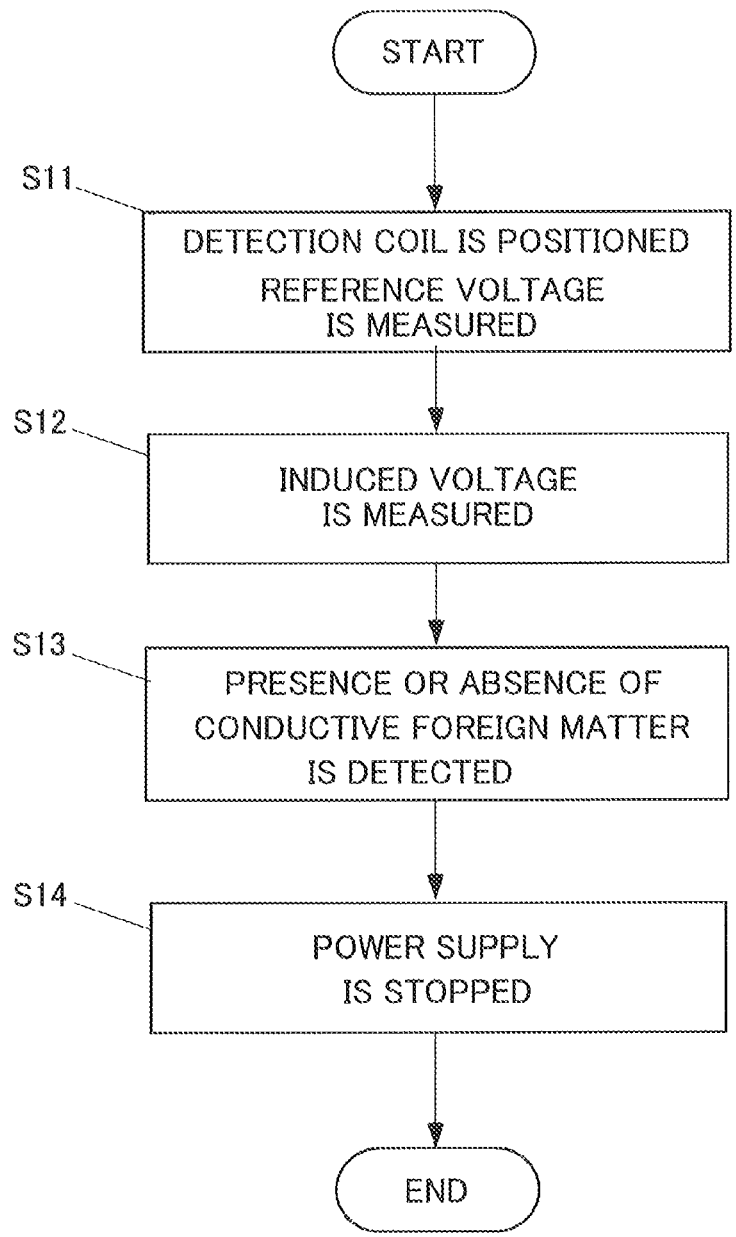

FOREIGN MATTER DETECTION DEVICE AND METHOD FOR WIRELESS POWER SUPPLY DEVICE

This application is a continuation application based on a PCT Patent Application No. PCT/JP2014/068168, filed Jul. 8, 2014, whose priority is claimed on Japanese Patent Application No. 2013-147603, filed Jul. 16, 2013 and Japanese Patent Application No. 2013-152515, filed Jul. 23, 2013. The contents of the PCT application and the Japanese Patent Applications are incorporated herein by reference.

TECHNICAL FIELD

The embodiments described herein relate to a foreign matter detection device for a wireless power supply device, and a method therefor. The present application claims a priority on the basis of Japanese Patent Application No. 2013-147603 filed in Japan on Jul. 16, 2013 and Japanese Patent Application No. 2013-152515 filed in Japan on Jul. 23, 2013, which are hereby incorporated by reference in their entirety.

BACKGROUND ART

In recent years, a hybrid electric vehicle (HEV) including an electric motor and an internal combustion engine has been put to practical use. In addition, an electric vehicle (EV) including an electric motor has also been put to practical use.

A wireless power supply device, which performs wireless power supply to the electric vehicle or the like, magnetically couples a primary coil of a power supply side with a secondary coil of a power receiving side to transmit electric power from the power supply side to the power receiving side in a wireless manner.

Such a wireless power supply device is disclosed in, e.g., Patent Literatures 1 and 2.

In a wireless power supply device of Patent Literature 1, axes of a primary coil and a secondary coil are vertical and coaxial. This type of wireless power supply device is called "a circular type".

Additionally, in a wireless power supply device of Patent Literature 2, axes of a primary coil and a secondary coil are positioned in parallel with each other. This type of wireless power supply device is called "a solenoid type".

The wireless power supply is roughly classified into three systems of an electromagnetic induction system, an electric wave system, and a magnetic field resonance system.

The electromagnetic induction system uses electromagnetic induction in which, when an electric current flows through one of two adjacent coils, a magnetic flux is generated as a medium to generate an electromotive force in the other coil.

In the electric wave system, a current is converted into an electromagnetic wave, which is transmitted and received via antennae.

In the magnetic field resonance system, a magnetic flux is used as a medium in the same manner as in the electromagnetic induction system, but a resonance phenomenon of an electric circuit is positively utilized, and an induction current flowing through a coil is amplified.

In the abovementioned wireless power supply device, when a metal foreign matter enters space between the primary coil and the secondary coil, there is a possibility that an eddy current is generated in the metal foreign matter and the metal foreign matter heats by Joule heat.

Therefore, a wireless power supply device which detects such a foreign matter is disclosed in, e.g., Patent Literature 3.

In the wireless power supply device of Patent Literature 3, which is a wireless power supply device of the abovementioned electromagnetic induction system, a third coil is interposed between a first coil and a second coil, and a foreign matter between the first coil and the second coil is detected on the basis of an induced voltage generated in the third coil.

CITATION LIST

Patent Literatures

PTL 1: Japanese Patent Application Laid-open Publication No. 2010-226889
PTL 2: Japanese Patent Application Laid-open Publication No. 2013-90392
PTL 3: Japanese Patent Application Laid-open Publication No. 2012-249401

SUMMARY

Technical Problem

When a third coil is interposed between a first coil and a second coil and an induced voltage generated in the third coil is detected, an induced voltage is generated even in a state where any foreign matter is not present between the first coil and the second coil.

Therefore, due to the presence of the induced voltage in spite of no foreign matter, it is difficult to detect the foreign matter by the third coil or there is a possibility that the foreign matter is wrongly detected.

The disclosure has been made to solve the abovementioned problem. In other words, an object of the disclosure is to provide a foreign matter detection device for a wireless power supply device and a method therefor, in which an induced voltage generated in a coil for foreign matter detection in the case of no electrically conductive foreign matter can be decreased, and consequently, a foreign matter detection sensitivity for detecting presence or absence of the conductive foreign matter can be enhanced and wrong detection can be suppressed.

Solution to Problem

According to a first aspect of the disclosure, there is provided a foreign matter detection device for a wireless power supply device, including:
a detection coil positioned between a power transmitting coil and a power receiving coil; and
a detection unit which detects an induced voltage generated in the detection coil and detects, from the detected induced voltage, presence or absence of a conductive foreign matter positioned between the power transmitting coil and the power receiving coil,
wherein the detection coil includes a continuous conductive wire in which two loop portions are wound in mutually opposite directions, and
an area or a winding number of each of the loop portions or a direction connecting centroids of the two loop portions is set so that an induced voltage generated in the detection coil when a conductive foreign matter is not present becomes 0 or a minimum.

The two loop portions may be positioned on the same plane positioned between the power transmitting coil and the power receiving coil, and may be arranged so that the direction connecting the centroids is perpendicular to a magnetic gradient direction at an installation position of the detection coil.

The loop portions may be circular, rectangular, triangular or rhombic loops positioned so that the loops do not overlap with each other on the same plane.

The detection unit may include a detecting unit which detects an induced voltage generated in the detection coil, and a determining unit which compares the detected induced voltage with a reference voltage generated when a conductive foreign matter is not present, to determine presence or absence of a conductive foreign matter.

In addition, according to a second aspect of the disclosure, there is provided a foreign matter detecting method for a wireless power supply device, including:

constituting a detection coil positioned between a power transmitting coil and a power receiving coil, by a continuous conductive wire in which two loop portions are wound in mutually opposite directions;

setting an area or a winding number of each loop portion or a direction connecting centroids of the two loop portions so that an induced voltage generated in the detection coil when a conductive foreign matter is not present between the power transmitting coil and the power receiving coil becomes 0 or a minimum; and detecting an induced voltage generated in the detection coil and detecting, from the detected induced voltage, presence or absence of a conductive foreign matter positioned between the power transmitting coil and the power receiving coil.

While moving the detection coil translatorily back and forth or right and left or rotating the detection coil around a vertical axis, an induced voltage generated in the detection coil may be measured, and the detection coil may be positioned at a position and a rotation angle at which a value of the measured induced voltage becomes 0 or the minimum.

According to a third aspect of the disclosure, there is provided a foreign matter detection device for a wireless power supply device, including:

a detection coil positioned between a power transmitting coil and a power receiving coil; and a detection unit which detects an induced voltage generated in the detection coil and detecting, from the detected induced voltage, presence or absence of a conductive foreign matter positioned between the power transmitting coil and the power receiving coil, wherein the detection coil includes one conductive wire bent into a rectangular shape, and the conductive wire surrounds magnetic fluxes generated in mutually opposite directions between the power transmitting coil and the power receiving coil to contain equal amounts of the magnetic fluxes, and is disposed so that an induced voltage generated when a conductive foreign matter is not present becomes 0 or a minimum.

A plurality of the detection coils are positioned so as not to overlap with each other and so as to be in parallel with each other on the same plane.

The detection unit may include a detecting unit which detects an induced voltage generated in the detection coil, and a determining unit which compares the detected induced voltage with a reference voltage generated when a conductive foreign matter is not present, to determine presence or absence of a conductive foreign matter.

In addition, according to a fourth aspect of the disclosure, there is provided a foreign matter detecting method for a wireless power supply device, including:

constituting a detection coil positioned between a power transmitting coil and a power receiving coil, by one continuous conductive wire bent into a rectangular shape;

disposing the conductive wire so that the conductive wire surrounds magnetic fluxes generated in mutually opposite directions between the power transmitting coil and the power receiving coil to contain equal amounts of the magnetic fluxes, and so that an induced voltage generated in the detection coil when a conductive foreign matter is not present becomes 0 or a minimum; and detecting an induced voltage generated in the detection coil and detecting, from the detected induced voltage, presence or absence of the conductive foreign matter positioned between the power transmitting coil and the power receiving coil.

While moving the detection coil translatorily back and forth or right and left or rotating the detection coil around a vertical axis, an induced voltage generated in the detection coil may be measured, and the detection coil may be positioned at a position and a rotation angle at which a value of the measured induced voltage becomes 0 or the minimum.

Effects

In the abovementioned device and method according to first and second aspects of the disclosure, a detection coil includes a continuous conductive wire in which two loop portions are wound in mutually opposite directions, and hence, induced currents due to a magnetic field flow in opposite directions in the two loop portions to cancel each other.

In addition, an area or a winding number of each loop portion or a direction connecting centroids of the two loop portions is set so that an induced voltage generated in the detection coil when a conductive foreign matter is not present becomes 0 or a minimum, and hence, even at a location where there is a magnetic gradient, an induced voltage generated in the detection coil when there is not a conductive foreign matter becomes 0 or the minimum.

Accordingly, an induced voltage generated in the coil for foreign matter detection when there is not a conductive foreign matter can be decreased, and consequently, a sensitivity of the foreign matter detection can be enhanced and wrong detection can be suppressed.

Additionally, in the abovementioned device and method according to third and fourth aspects of the disclosure, a detection coil positioned between a power transmitting coil and a power receiving coil is provided, and hence, when a conductive foreign matter enters at space between the power transmitting coil and the power receiving coil or in the vicinity of the space, an induced voltage can be generated.

In addition, the detection coil includes one conductive wire bent into a rectangular shape, and this conductive wire surrounds magnetic fluxes generated in mutually opposite directions between the power transmitting coil and the power receiving coil to contain equal amounts of the magnetic fluxes, and is disposed so that an induced voltage generated when a conductive foreign matter is not present becomes 0 or a minimum. Consequently, an induced voltage (i.e., a reference voltage) generated in the detection coil when there is not a conductive foreign matter becomes 0 or the minimum.

Accordingly, the induced voltage (i.e., the reference voltage) generated in the detection coil when there is not a conductive foreign matter can be decreased, and consequently, a sensitivity of the foreign matter detection can be enhanced and wrong detection can be suppressed.

BRIEF DESCRIPTION OF DRAWINGS

FIG. 1A is a use state diagram of a wireless power supply device including a foreign matter detection device according to a first embodiment;

FIG. 1B is a block circuit diagram of the wireless power supply device including the foreign matter detection device according to the first embodiment;

FIG. 2A illustrates an installation position of a detection coil according to the first embodiment;

FIG. 2B illustrates another installation position of the detection coil according to the first embodiment;

FIG. 2C illustrates still another installation position of the detection coil according to the first embodiment;

FIG. 3 is a configuration diagram of a detection unit according to the first embodiment;

FIG. 4A is a side view illustrating a concrete example of the detection coil positioned between a power transmitting coil and a power receiving coil according to the first embodiment;

FIG. 4B is a sectional view taken in the B-B plane of FIG. 4A;

FIG. 5A illustrates an example where areas of loop portions according to the first embodiment are different;

FIG. 5B illustrates an example where areas and the winding numbers of the loop portions according to the first embodiment are different;

FIG. 5C illustrates an example where shapes of the loop portions according to the first embodiment are rectangular;

FIG. 6A is a principle explanatory view of foreign matter detection in a detection coil of FIG. 5C, illustrating that any conductive foreign matter is not present;

FIG. 6B is a principle explanatory view of the foreign matter detection in the detection coil of FIG. 5C, illustrating that a conductive foreign matter is present;

FIG. 7 illustrates an arrangement example of a plurality of detection coils according to the first embodiment;

FIG. 8 is a flowchart of a foreign matter detecting method according to the first embodiment;

FIG. 9 is a configuration diagram of a wireless power supply device including a foreign matter detection device according to a second embodiment;

FIG. 10A is an illustration for describing a case where a conductive foreign matter enters;

FIG. 10B is another illustration for describing the case where the conductive foreign matter enters;

FIG. 10C is another illustration for describing the case where the conductive foreign matter enters;

FIG. 11 is a configuration diagram of a detection coil according to a first example in the second embodiment;

FIG. 12 is a configuration diagram of a detection coil according to a second example in the second embodiment; and FIG. 13 is a flowchart of a foreign matter detecting method according to the second embodiment.

DESCRIPTION OF EMBODIMENTS

Hereinafter, embodiments will be described in detail with reference to the accompanying drawings. Common parts in the respective drawings are denoted with the same reference signs and overlapping description is omitted.

First Embodiment

FIG. 1A and FIG. 1B are configuration diagrams of a wireless power supply device 2 including a foreign matter detection device 10 according to a first embodiment, FIG. 1A is a use state diagram, and FIG. 1B is a block circuit diagram. The foreign matter detection device 10 according to the first embodiment is the foreign matter detection device 10 for the wireless power supply device.

In these drawings, the wireless power supply device 2 supplies power (electric power) from a power transmitting coil 3 to a power receiving coil 4 in a wireless manner by electromagnetic induction.

In FIG. 1A, 1 designates a parking space, 3 designates the power transmitting coil, 4 designates the power receiving coil, 5 designates a power receiving side rectifier, and 6 designates a car-mounted battery.

The wireless power supply device 2 includes an AC power source $2a$, a power transmitting side rectifier $2b$, an inverter $2c$ and the power transmitting coil 3, and supplies, to the power transmitting coil 3, the power converted into a high frequency wave.

The power transmitting coil 3 generates a magnetic field of the high frequency wave by this power. By this magnetic field, the power of the high frequency wave is generated in the power receiving coil 4. This power is converted into a direct current by the power receiving side rectifier 5, and charged into the car-mounted battery 6.

In FIGS. 1A and 1B, the foreign matter detection device 10 according to the first embodiment includes a detection coil 12 and a detection unit 14.

The detection coil 12 is positioned between the power transmitting coil 3 and the power receiving coil 4.

FIG. 2A to FIG. 2C are diagrams each showing an installation position of the detection coil 12. FIG. 2A is an example where the detection coil 12 is installed close to the power transmitting coil 3, FIG. 2B is an example where the detection coil is installed close to the power receiving coil 4, and FIG. 2C is an example where the two detection coils 12 are installed close to the power transmitting coil 3 and the power receiving coil 4, respectively.

As shown in these drawings, the detection coil 12 may be installed close to either one of the coils as long as the detection coil 12 is interposed between the power transmitting coil 3 and the power receiving coil 4, or may be installed at an intermediate position between both the coils.

The detection unit 14 detects an induced voltage V generated in the detection coil 12, and detects, from this induced voltage, presence or absence of a conductive (electrically conductive) foreign matter (not shown) positioned between the power transmitting coil 3 and the power receiving coil 4.

FIG. 3 is a configuration diagram of the detection unit 14.

The detection unit 14 may be a computer (PC) including a storage device and an arithmetic operation device, and may include a detecting unit $14a$ and a determining unit $14b$.

The detecting unit $14a$ detects the induced voltage V generated in the detection coil 12.

The determining unit $14b$ compares the detected induced voltage V with a reference voltage V0 that is generated when the conductive foreign matter is not present, to determine the presence or absence of the conductive foreign matter.

The reference voltage V0 that is generated when the conductive foreign matter is not present may beforehand be stored in the storage device.

FIG. 4A and FIG. 4B are diagrams showing a concrete example of the detection coil 12 positioned between the power transmitting coil 3 and the power receiving coil 4, FIG. 4A is a side view, and FIG. 4B is a sectional view in a B-B plane. In addition, each of FIG. 4A and FIG. 4B also schematically shows a magnetic field generated around the power transmitting coil 3 and the power receiving coil 4 when the power converted into the high frequency wave is supplied to the power transmitting coil 3.

In FIG. 4A, axes of the power transmitting coil 3 and the power receiving coil 4 are positioned in parallel with each other. In other words, these drawings show the abovementioned "solenoid type" of wireless power supply device 2. Additionally, in FIG. 4A, respective broken lines show magnetic force lines.

In these drawings, the power transmitting coil 3 and the power receiving coil 4 are shown as cylindrical types, but the disclosure is not limited to this embodiment, and a shape of each coil may have a rectangular cross section or may be any other shape. In addition, the power transmitting coil 3 and the power receiving coil 4 are each illustrated to include a hollow inside as an air core, but may each include ferrite or the like in the inside thereof.

In addition, the disclosure is not limited to "the solenoid type", and the wireless power supply device 2 may be the abovementioned "circular type" in which the respective axes of the power transmitting coil 3 and the power receiving coil 4 are vertical and coaxial.

In FIG. 4A, the B-B plane is a symmetry plane of the power transmitting coil 3 and the power receiving coil 4, but the disclosure is not limited to this plane, and the plane may be any plane as long as the plane is positioned between the power transmitting coil 3 and the power receiving coil 4.

The detection coil 12 may be at an arbitrary position on the B-B plane.

FIG. 4B shows a distribution of the magnetic field on the B-B plane, and each broken line shows an equal magnetic field line (a line on which a magnetic field strength is equal).

In this drawing, the detection coil 12 includes a continuous conductive (electrically conductive) wire 13 in which two loop portions 12a are wound in mutually opposite directions. Both end portions 13a and 13b of the continuous conductive wire 13 are connected to the detection unit 14 via an unshown signal wire. This signal wire is disposed so that the signal wire is not influenced by the magnetic field.

An area or the winding number of each loop portion 12a or a direction (a line segment C-C) connecting centroids of the two loop portions 12a is set so that the induced voltage V (i.e., the reference voltage V0) generated in the detection unit 14 when the conductive foreign matter is not present becomes 0 or a minimum.

In addition, the induced voltage V (i.e., the reference voltage V0) generated in the detection coil 12 when the conductive foreign matter is not present is beforehand stored in the storage device of the detection unit 14.

In this example, the two loop portions 12a have the same area and winding number, and are arranged so that the direction (the line segment C-C) connecting the centroids of the loop portions 12a is perpendicular to a magnetic gradient direction (shown by a broken line arrow in the drawing) at the installation position of the detection coil 12.

According to this constitution, the detection coil includes the continuous conductive wire 13 in which the two loop portions 12a are wound in the mutually opposite directions, and the two loop portions 12a have the same area and winding number, and consequently, even at a place where there is the magnetic gradient, induced currents i1 and i2 due to the magnetic field are substantially the same, and the two induced currents i1 and i2 flow in the opposite directions in the two loop portions 12a to cancel each other.

Therefore, even at the place where there is the magnetic gradient, the reference voltage V0 generated in the detection coil 12 when there is not the conductive foreign matter substantially becomes 0.

FIG. 5A to FIG. 5C are diagrams showing other configuration examples of the loop portions 12a. FIG. 5A is an example where the areas are different, FIG. 5B is an example where the areas and the winding numbers are different, and FIG. 5C is an example where each shape is rectangular.

As shown in FIG. 5A and FIG. 5B, the area and winding number of each loop portion 12a may be different. In addition, the loop portions 12a may be circular, rectangular, triangular or rhombic loops positioned on the same plane so as not to overlap with each other.

FIG. 6A and FIG. 6B are explanatory diagrams of principle of foreign matter detection for the detection coil 12 of the FIG. 5C, FIG. 6A shows that any conductive foreign matter is not present between the power transmitting coil 3 and the power receiving coil 4, and FIG. 6B shows that the conductive foreign matter is present.

When any conductive foreign matter is not present, and when the detection coil includes the continuous conductive wire 13 in which the two loop portions 12a are wound in the mutually opposite directions as shown in FIG. 6A, and the two loop portions 12a have the same area and winding number, magnetic fluxes of the two loop portions 12a are equal. Therefore, in this case, the induced currents i1 and i2 generated are the same, the induced currents i1 and i2 flow in the opposite directions in the two loop portions 12a to cancel each other, and hence, the induced voltage V (i.e., the reference voltage V0) generated in the detection coil 12 substantially becomes 0.

Even at the place where there is the magnetic gradient, as shown in FIG. 4B, the detection coil is disposed so that the direction (the line segment C-C) connecting the centroids of the loop portions 12a is perpendicular to the magnetic gradient direction (shown by the broken line arrow in the drawing) at the installation position of the detection coil 12, and hence, the induced voltage V (i.e., the reference voltage V0) generated in the detection coil 12 when any conductive foreign matter is not present similarly becomes 0 or a minimum.

When the conductive foreign matter is present, as shown in FIG. 6B, the magnetic flux of the loop portion 12a in which the conductive foreign matter is present is stronger, and hence, one induced current i1 is larger than the other induced current i2, and the induced voltage V generated in the detection coil 12 becomes larger.

Accordingly, the detected induced voltage V can be compared with the reference voltage V0 generated when any conductive foreign matter is not present, to determine the presence or absence of the conductive foreign matter.

FIG. 7 is a diagram showing an arrangement example of a plurality of the detection coils 12. In this drawing, an equal magnetic field line is the same as in FIG. 4B. Additionally, in the detection coil 12, the rectangular or triangular loop portions 12a are used.

As shown in the drawing, a plurality of the detection coils 12 are used, and set so that the induced voltage V (i.e., the reference voltage V0) generated in each detection coil 12 when any conductive foreign matter is not present becomes 0 or a minimum, and hence, when the conductive foreign matter is present, a position of the conductive foreign matter can be detected.

FIG. 8 is a flowchart of a foreign matter detecting method according to the first embodiment. The foreign matter detecting method according to the first embodiment includes respective steps S1 to S4. The detection coil 12 is constituted by the continuous conductive wire 13 in which the two loop portions 12a are wound in the mutually opposite directions, and prior to carrying out the step S1, the area or winding number of each loop portion 12a or the direction connecting the centroids of the two loop portions 12a is set so that the induced voltage V (i.e., the reference voltage V0) generated in the detection coil 12 when any conductive foreign matter is not present between the power transmitting coil 3 and the power receiving coil 4 becomes 0 or the minimum.

At the step S1, the detection coil 12 is positioned between the power transmitting coil 3 and the power receiving coil 4. More specifically, while moving the detection coil 12 translatorily back and forth or right and left by a small amount in a direction perpendicular to an axis of the loop portion 12a or slightly rotating the detection coil around a vertical axis perpendicular to the axis of the loop portion 12a, the induced voltage V generated in the detection coil 12 is measured, and the detection coil is positioned at a position and a rotation angle at which a measured value of the induced voltage V becomes 0 or a minimum. Afterward, the position and rotation angle of the detection coil 12 are fixed.

The induced voltage V (i.e., the reference voltage V0) generated in the detection coil 12 at the fixed position and rotation angle is measured and stored.

The area or winding number of each loop portion 12a of the detection coil 12 or the direction connecting the centroids of the two loop portions 12a is set so that the induced voltage V (i.e., the reference voltage V0) generated in the detection coil 12 becomes 0 or the minimum. However, when the magnetic field generated in the wireless power supply device 2 slightly changes due to, e.g., an influence of a substance which is present nearby, the induced voltage V (i.e., the reference voltage V0) generated in the detection coil 12 strictly deviates from 0 or the minimum. Thus, the step S1 is carried out to obtain an effect that even when the magnetic field slightly changes, the detection coil 12 can be installed at the position and rotation angle at which the induced voltage V (i.e., the reference voltage V0) strictly becomes 0 or the minimum.

At the step S2, the induced voltage V generated in the detection coil 12 is detected.

At the step S3, the induced voltage V generated in the detection coil 12 is detected, and from this induced voltage, the presence or absence of a conductive foreign matter positioned between the power transmitting coil 3 and the power receiving coil 4 is detected.

Specifically, for example, when a difference between the induced voltage V measured at the step S2 and the reference voltage V0 measured at the step S1 exceeds a predetermined threshold value, it is determined that a conductive foreign matter is present between the power transmitting coil 3 and the power receiving coil 4.

When it is determined at the step S3 that a conductive foreign matter is present, the power supply is stopped (the step S4).

According to the abovementioned device and method of the first embodiment, the detection coil 12 includes the continuous conductive wire 13 in which the two loop portions 12a are wound in the mutually opposite directions, and hence, the induced currents i1 and i2 due to the magnetic field flow in the opposite direction in the two loop portions 12a to cancel each other.

In addition, the area or winding number of each loop portion 12a or the direction connecting the centroids of the two loop portions 12a is set so that the induced voltage V (i.e., the reference voltage V0) generated in the detection coil 12 when any conductive foreign matter is not present becomes 0 or the minimum. Hence, even at the place where there is the magnetic gradient, the induced voltage V generated in the detection coil 12 when there is not a conductive foreign matter becomes 0 or the minimum.

Accordingly, the induced voltage V generated in the coil for foreign matter detection when there is not a conductive foreign matter can be decreased, and consequently, a sensitivity of the foreign matter detection can be enhanced and wrong detection can be suppressed.

Second Embodiment

FIG. 9 is a configuration diagram of a wireless power supply device 102 including a foreign matter detection device 110 according to a second embodiment. The foreign matter detection device 110 according to the second embodiment is the foreign matter detection device 110 for the wireless power supply device.

In this drawing, the wireless power supply device 102 supplies power from a power transmitting coil 103 to a power receiving coil 104 in a wireless manner.

In addition, the wireless power supply device 102 in this drawing includes an AC power source 102a, a power transmitting side rectifier 102b, an inverter 102c, and the power transmitting coil 103. The power transmitting side rectifier 102b converts AC power from the AC power source 102a into DC power. The inverter 102c converts the DC power from the power transmitting side rectifier 102b into AC power of a high frequency wave. The power transmitting coil 103 generates a magnetic field of the high frequency wave by the AC power from the inverter 102c, and by this magnetic field, the AC power is generated in the power receiving coil 104, i.e., the power supply is performed in a wireless manner.

Furthermore, a power receiving device 101 includes the power receiving coil 104, a power receiving side rectifier 105, and a car-mounted battery 106. The AC power generated in the power receiving coil 104 is converted into DC power in the power receiving side rectifier 105. This DC power is charged into the car-mounted battery 106.

FIG. 10A to FIG. 10C are explanatory diagrams in a case where a conductive foreign matter 107 enters.

The wireless power supply from the power transmitting coil 103 to the power receiving coil 104 is performed by, as shown in, e.g., FIG. 10A, a current flowing through the power transmitting coil 103 to generate a magnetic flux (a magnetic flux in an upward direction in this example), thereby generating an induced current in the power receiving coil 104.

Here, as shown in FIG. 10B, for example, when a conductive foreign matter 107 enters at space between the power transmitting coil 103 and the power receiving coil 104 or in the vicinity of the space (specifically, in a range in which the magnetic flux is generated under a vehicle by the current flowing through the power transmitting coil 103), the magnetic flux passes through the conductive foreign matter 107. In this case, as shown in FIG. 10C, there is a possibility that an eddy current is generated in the conductive foreign matter 107 and the conductive foreign matter heats by Joule heat.

For this reason, when the conductive foreign matter 107 enters at the space between the power transmitting coil 103 and the power receiving coil 104 or in the vicinity of the space, this conductive foreign matter is detected.

In FIG. 9, the foreign matter detection device 110 includes a detection coil 112 and a detection unit 114.

FIG. 11 is a configuration diagram of the detection coil 112 according to a first example of the second embodiment.

The power transmitting coil 103 and the power receiving coil 104 in this example are wound around iron cores 103a and 104a extending in a horizontal direction. The disclosure is not limited to this example, and the power transmitting coil 103 and the power receiving coil 104 may be wound around the iron cores 103a and 104a extending in a vertical direction.

As shown in FIG. 11, the detection coil 112 is a coil positioned between the power transmitting coil 103 and the power receiving coil 104, and includes one conductive wire 113 bent into a rectangular shape parallel to a horizontal plane in this example. Both end portions 113a and 113b of the one conductive wire 113 are connected to the detection unit 114 via an unshown signal wire. This signal wire is disposed so that the signal wire is not influenced by the magnetic field.

The detection coil 112 may be disposed at a position close to the power transmitting coil 103 or the power receiving coil 104, but may be disposed at an intermediate position between the power transmitting coil 103 and the power receiving coil 104.

Additionally, in the detection coil 112 of FIG. 11, one conductive wire 113 surrounds magnetic fluxes generated in mutually opposite directions (upward and downward directions in the drawing) between the power transmitting coil 103 and the power receiving coil 104 to contain equal amounts of the magnetic fluxes in the mutually opposite directions, and is disposed so that an induced voltage V (i.e., a reference voltage V0) generated when the conductive foreign matter 107 is not present becomes 0 or a minimum.

In other words, in a rectangular portion between the power transmitting coil 103 and the power receiving coil 104, the magnetic flux in the upward direction (the right side magnetic flux in the drawing) and the magnetic flux in the downward direction (the left side magnetic flux in the drawing) are present. Thus, the detection coil 112 is disposed so that the equal amounts of the magnetic flux in the upward direction and the magnetic flux in the downward direction are contained in the rectangular shape, and hence, also in consideration of the directions of the magnetic fluxes, a sum of the magnetic fluxes in a region surrounded by the conductive wire 113 becomes 0 or a minimum.

According to this configuration, when the conductive foreign matter 107 is not present, the induced voltage V (i.e., the reference voltage V0) generated in the detection coil 112 can be made 0 or the minimum.

As in this example, when the power transmitting coil 103 and the power receiving coil 104 are wound around the iron cores 103a and 104a extending in the horizontal direction and have symmetric shapes, the magnetic flux in the upward direction (the right side magnetic flux in the drawing) and the magnetic flux in the downward direction (the left side magnetic flux in the drawing) are symmetrically generated on the right and left sides of the A-A' axis in FIG. 11. Hence, the detection coil 112 may be disposed so that the center of the rectangular shape of the conductive wire 113 lies on the A-A' axis and the rectangular shape becomes symmetric on the right and left sides of the A-A' axis.

In the wireless power supply device 102 for the vehicle shown in FIG. 9, the power transmitting coil 103 is disposed on a ground side, and the power receiving coil 104 is disposed in a bottom part of the vehicle.

Accordingly, the conductive foreign matter 107 in this case often enters and lies on the power transmitting coil 103 (or in the vicinity thereof). Therefore, in consideration of this problem, the detection coil 112 may be disposed at a position close to the power transmitting coil 103.

The detection unit 114 detects the induced voltage V generated in the detection coil 112, and detects, from this voltage, the presence or absence of the conductive foreign matter 107 positioned between the power transmitting coil 103 and the power receiving coil 104.

The detection unit 114 may be a computer (PC) including a storage device and an arithmetic operation device, and includes a detecting unit 114a and a determining unit 114b.

The detecting unit 114a detects the induced voltage V generated in the detection coil 112.

The determining unit 114b compares the detected induced voltage V with the reference voltage V0 generated when the conductive foreign matter 107 is not present, to determine the presence or absence of the conductive foreign matter 107.

The reference voltage V0 generated when the conductive foreign matter 107 is not present may beforehand be stored in the storage device.

According to the abovementioned configuration, it is possible to detect that the induced voltage V is generated in the detection coil 112, so that when the conductive foreign matter 107 enters at space between the power transmitting coil 103 and the power receiving coil 104 or in the vicinity of the space, this fact can be detected.

FIG. 12 is a configuration diagram of a detection coil 112 according to a second example of the second embodiment.

FIG. 12 shows an example where four detection coils 112 are present, and each of the detection coils 112 includes one conductive wire 113.

Each of the conductive wires 113 surrounds magnetic fluxes generated in mutually opposite directions between a power transmitting coil 103 and a power receiving coil 104 to contain equal amounts of the magnetic fluxes in the mutually opposite directions, and is disposed so that an induced voltage V (i.e., a reference voltage V0) generated when a conductive foreign matter 107 is not present becomes 0 or a minimum.

In addition, the four detection coils 112 in this example are positioned without overlapping and in parallel with each other on the same plane.

In other words, in the detection coil 112 between the power transmitting coil 103 and the power receiving coil 104, the magnetic flux in an upward direction (a right side magnetic flux in the drawing) and the magnetic flux in a downward direction (a left side magnetic flux in the drawing) are present in a rectangular shape of the detection coil. For this reason, each of the respective detection coils 112 is arranged so that equal amounts of the magnetic flux in the upward direction and the magnetic flux in the downward direction are contained in the rectangular shape.

According to this configuration, when the conductive foreign matter 107 is not present, the induced voltage V (i.e., the reference voltage V0) generated in each of the detection coils 112 can be made 0 or the minimum.

According to the abovementioned configuration, a plurality of the detection coils 112 are present, and hence, by determining which detection coil 112 has detected the conductive foreign matter 107, it is possible to not only detect whether or not the conductive foreign matter 107 is present between the power transmitting coil 103 and the power receiving coil 104, but also detect a position in a horizontal direction where the conductive foreign matter is present.

In this second example, since a voltage of each of the detection coils 112 is measured, the detection units 114 are provided for the detection coil respectively, or the detection unit 114 capable of measuring voltages of a plurality of locations is used. Furthermore, the determining unit 114b detects a voltage change of each of the detection coils 112.

As in this example, when the power transmitting coil 103 and the power receiving coil 104 are wound around iron cores 103a and 104a extending in the horizontal direction and have a symmetric shape, the magnetic flux in the upward direction (the right side magnetic flux in the drawing) and the magnetic flux in the downward direction (the left side magnetic flux in the drawing) are symmetrically generated on the right and left sides of the B-B' axis in FIG. 12. Accordingly, in this case, the respective detection coils 112 may be disposed so that the center of the rectangular shape of each of the conductive wires 113 lies on the B-B' axis and so that the rectangular shape becomes symmetric on the right and left sides of the B-B' axis.

In other words, the respective detection coils 112 are positioned in parallel. Furthermore, a plurality of the detection coils 112 are arranged so that the detection coils do not overlap with each other, and hence, a position of the conductive foreign matter 107 in the horizontal direction can be effectively identified.

FIG. 13 is a flowchart of a foreign matter detecting method of the disclosure.

The foreign matter detecting method of the disclosure includes respective steps S11 to S14. The detection coil 112 in this method is constituted by one conductive wire 113 bent into the rectangular shape, and the conductive wire 113 surrounds the magnetic fluxes generated in the mutually opposite directions between the power transmitting coil 103 and the power receiving coil 104 to contain the equal amounts of the magnetic fluxes in the mutually opposite directions.

At the step S11, the detection coil 112 is positioned between the power transmitting coil 103 and the power receiving coil 104. More specifically, while moving the detection coil 112 translatorily back and forth or right and left by a small amount in a direction perpendicular to an axis of the detection coil 112 or slightly rotating the detection coil around a vertical axis perpendicular to the axis of the detection coil 112, the induced voltage V generated in the detection coil 112 is measured, and the detection coil is positioned at a position and a rotation angle at which a measured value of the induced voltage V becomes 0 or a minimum. Afterward, the position and rotation angle of the detection coil 112 are fixed.

The induced voltage V (i.e., the reference voltage V0) generated in the detection coil 112 at the fixed position and rotation angle is measured and stored.

The conductive wire 113 of the detection coil 112 surrounds the magnetic fluxes generated in the mutually opposite directions (the upward and downward directions in the drawing) between the power transmitting coil 103 and the power receiving coil 104 to contain the equal amounts of the magnetic fluxes in the mutually opposite directions, and is disposed so that the induced voltage V (i.e., the reference voltage V0) generated in the detection coil 112 (i.e., between the end portions 113a and 113b of the conductive wire 113) when the conductive foreign matter 107 is not present becomes 0 or the minimum. However, when the magnetic field generated in the wireless power supply device 102 slightly changes due to, e.g., the influence of the substance which is present nearby, the induced voltage V (i.e., the reference voltage V0) generated in the detection coil 112 deviates from 0 or the minimum in a strict sense. The step S11 is carried out to thereby obtain the effect that the detection coil 112 can be installed at the position and rotation angle at which the induced voltage V (i.e., the reference voltage V0) strictly becomes 0 or the minimum, even if the magnetic field slightly changes.

At the step S12, the induced voltage V generated in the detection coil 112 is detected.

At the step S13, the presence or absence of the conductive foreign matter 107 between the power transmitting coil 103 and the power receiving coil 104 is determined from the induced voltage V detected at the step S12.

Specifically, for example, when a difference between the induced voltage V measured at the step S12 and the reference voltage V0 measured at the step S11 exceeds a predetermined threshold value, it is determined that the conductive foreign matter 107 is present between the power transmitting coil 103 and the power receiving coil 104.

When it is determined at the step S13 that the conductive foreign matter 107 is present, the power supply is stopped (the step S14).

According to the abovementioned device and method of the second embodiment, the detection coil 112 positioned between the power transmitting coil 103 and the power receiving coil 104 is provided, and hence, it is possible to generate the induced voltage V when the conductive foreign matter 107 enters at the space between the power transmitting coil 103 and the power receiving coil 104 or in the vicinity of the space.

In addition, the detection coil 112 includes the one conductive wire 113 bent into the rectangular shape, and the conductive wire 113 surrounds the magnetic fluxes generated in the mutually opposite directions between the power transmitting coil 103 and the power receiving coil 104 to contain the equal amounts of the magnetic fluxes in the mutually opposite directions, and is disposed so that the induced voltage V generated when the conductive foreign matter 107 is not present becomes 0 or the minimum. Consequently, the induced voltage V (i.e., the reference voltage V0) generated in the detection coil 112 when there is not the conductive foreign matter 107 becomes 0 or the minimum.

Therefore, the induced voltage V (i.e., the reference voltage V0) generated in the detection coil 112 when there is not the conductive foreign matter 107 can be decreased, and consequently, a sensitivity of the foreign matter detection can be enhanced and wrong detection can be suppressed.

The disclosure is not limited to the abovementioned embodiments, is represented by claims, and includes all modifications described in the claims in the meaning and scope equivalent to those of the description of the claims. For example, the disclosure is not limited to a magnetic field resonance system, and is also applicable to another system of wireless power supply, e.g., an electromagnetic induction system. In addition, the disclosure is not limited to the presence or absence of the iron cores of the power transmitting coil 3 or 103 and the power receiving coil 4 or 104.

REFERENCE SIGNS LIST i1 induced current
i2 induced current
V induced voltage
V0 reference voltage 1 parking space
2 wireless power supply device
2a AC power source
2b power transmitting side rectifier
2c inverter
3 power transmitting coil
4 power receiving coil
5 power receiving side rectifier
6 car-mounted battery
10 foreign matter detection device
12 detection coil
12a loop portion
13 conductive wire
13a end portion
13b end portion
14 detection unit (computer)
14a detecting unit
14b determining unit
101 power receiving device
102 wireless power supply device
102a AC power source
102b power transmitting side rectifier
102c inverter
103 power transmitting coil
103a iron core
104 power receiving coil
104a iron core
105 power receiving side rectifier
106 car-mounted battery
107 conductive foreign matter
110 foreign matter detection device
112 detection coil
113 conductive wire
113a end portion
113b end portion
114 detection unit (computer)
114a detecting unit
114b determining unit

The invention claimed is:

1. A foreign matter detection device for a wireless power supply device, comprising:
a detection coil positioned between a power transmitting coil and a power receiving coil; and
a detection unit which detects an induced voltage generated in the detection coil and detects, from the detected induced voltage, presence or absence of a conductive foreign matter positioned between the power transmitting coil and the power receiving coil,
wherein the detection coil comprises a continuous conductive wire in which two loop portions are wound in mutually opposite directions,
a center part of the detection coil is positioned off a center axis of the power transmitting coil, and is positioned off a center axis of the power receiving coil, and
an area or a winding number of each of the loop portions or a direction connecting centroids of the two loop portions is set so that an induced voltage generated in the detection coil when a conductive foreign matter is not present becomes 0 or a minimum.

2. The foreign matter detection device for the wireless power supply device according to claim 1,
wherein the two loop portions are positioned on the same plane positioned between the power transmitting coil and the power receiving coil, and are arranged so that the direction connecting the centroids is perpendicular to a magnetic gradient direction at an installation position of the detection coil.

3. The foreign matter detection device for the wireless power supply device according to claim 2,
wherein the loop portions are circular, rectangular, triangular or rhombic loops positioned so that the loops do not overlap with each other on the same plane.

4. The foreign matter detection device for the wireless power supply device according to claim 1,
wherein the detection unit includes a detecting unit which detects an induced voltage generated in the detection coil, and a determining unit which compares the detected induced voltage with a reference voltage generated when a conductive foreign matter is not present, to determine presence or absence of a conductive foreign matter.

5. A foreign matter detecting method for a wireless power supply device, comprising:
constituting a detection coil positioned between a power transmitting coil and a power receiving coil, by a continuous conductive wire in which two loop portions are wound in mutually opposite directions;
positioning a center part of the detection coil off a center axis of the power transmitting coil and a center axis of the power receiving coil, and setting an area or a winding number of each loop portion or a direction connecting centroids of the two loop portions so that an induced voltage generated in the detection coil when a conductive foreign matter is not present between the power transmitting coil and the power receiving coil becomes 0 or a minimum; and
detecting an induced voltage generated in the detection coil and detecting, from the detected induced voltage, presence or absence of a conductive foreign matter positioned between the power transmitting coil and the power receiving coil.

6. The foreign matter detecting method for the wireless power supply device according to claim 5,
wherein while moving the detection coil translatorily back and forth or right and left or rotating the detection coil around a vertical axis, an induced voltage generated in the detection coil is measured, and the detection coil is positioned at a position and a rotation angle at which a value of the measured induced voltage becomes 0 or the minimum.

* * * * *